UNITED STATES PATENT OFFICE.

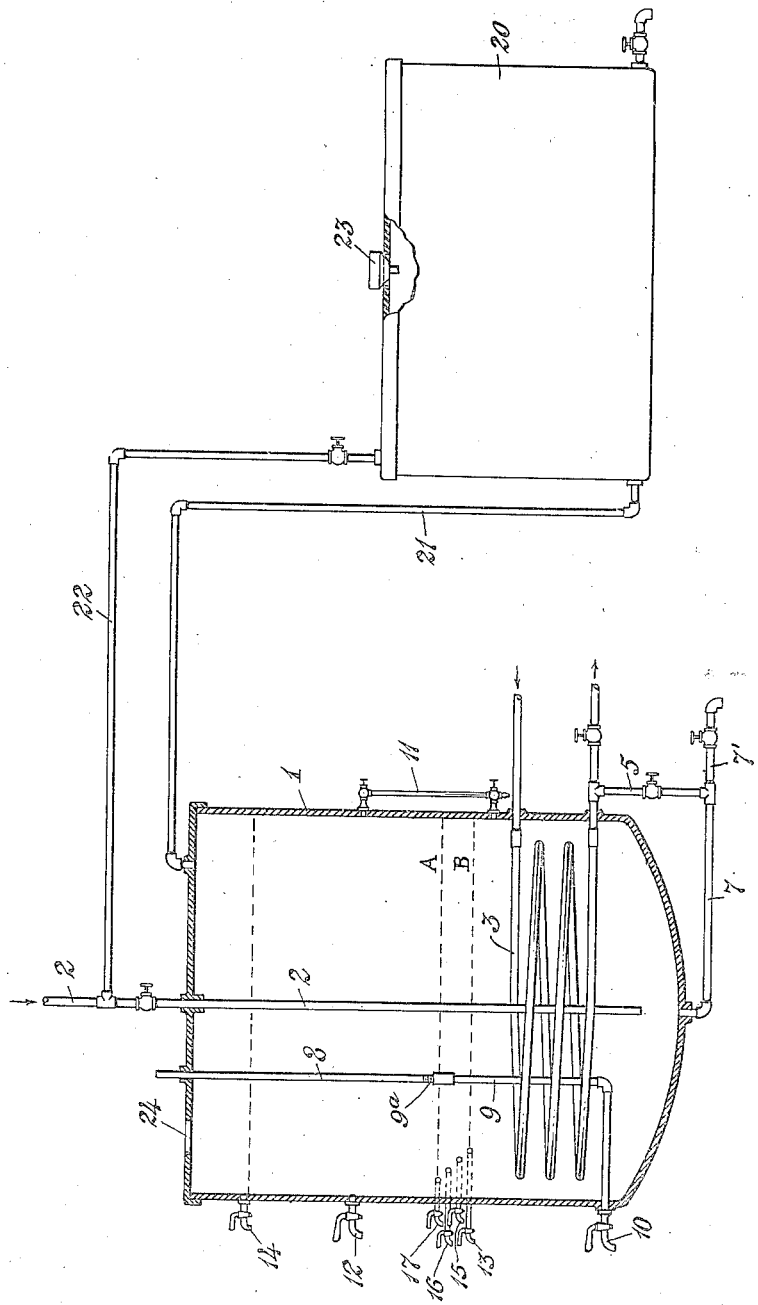

CHARLES J. SKIDMORE, OF BROOKLYN, AND PETER F. CONERTY, OF NEW YORK, N. Y.

PROCESS OF SEPARATING OIL.

1,302,094.  Specification of Letters Patent.  Patented Apr. 29, 1919.

Application filed October 24, 1914. Serial No. 868,365.

*To all whom it may concern:*

Be it known that we, CHARLES J. SKIDMORE and PETER F. CONERTY, both citizens of the United States, and residents, respectively, of the borough of Brooklyn, city and State of New York, and the borough of Queens, city and State of New York, have invented a certain new and useful Process of Separating Oil, of which the following is a specification.

Our invention relates to the separation of foreign matter from lubricating oil which has been used one or more times, as for the lubrication of engines, pumps or other machinery, and which has been thus contaminated so as to make it unfit for further use without being cleansed. The methods heretofore employed for removing foreign matter from such used oil have been principally methods of filtration, but such methods, especially when applied to oil which has been used to lubricate internal combustion engines, are defective because they do not result in a practical separation, the oil separated by filtration containing so much foreign matter as at times to clog the lubricant feeding cups and to cause undue wear upon the bearings for the lubrication of which the recovered oil is used.

The object of our invention, broadly stated, is to accomplish a substantially perfect separation of the foreign matter from the used oil, so that the separated or recovered oil can be used without danger of clogging the feed cups or injuring the bearings. We have found that the desired separation can be obtained by subjecting the contaminated oil to treatment with a liquid which is incapable, under the conditions, of forming compounds with the oil and which is heavier than the oil, such liquid being, preferably, a water solution of tri-sodium phosphate, such treatment comprising thorough agitation of the liquid and oil followed by allowing the mixture to stand and settle until the oil separates out in pure condition as a layer resting upon layers of impurities and treatment liquid.

In carrying out our process, we preferably may make use of the apparatus shown in the accompanying drawings in which the figure shows a vertical section of the apparatus.

The apparatus, as shown, consists of a tank 1 of suitable shape and size, in which the separating process is carried on, with connections to said tank for filling, heating, mixing or agitating and drawing off its contents. Extending into and toward the bottom of this tank is an air conduit 2 by which air or other suitable fluid may be brought into the tank to agitate and mix the contents thereof. A coil pipe 3 is provided for conducting hot water or steam; from this pipe hot water may be introduced into the tank through the valved pipe 5 and pipe 7, which pipe 7 is suitably arranged and connected so as also to serve for drawing off the treatment solution and impurities, and discharge them through the branch pipe 7'.

A pipe 9 is placed within the tank with its outlet 10 externally of the tank and at a lower level than its intake $9^a$, the level of which is located approximately at the lower level or surface of the separated oil, when a full batch of impure oil has been treated. Through this pipe, the separated oil is adapted to be withdrawn, but during the treatment, the inlet $9^a$ is closed by a suitable valve, such as the pipe 8, the upper end of which extends above the tank so as to be convenient to manipulate, and the lower end of which is screw threaded so that the pipe can be screwed into the screw threaded inlet $9^a$. A gage glass 11 and an additional spigot 12 for drawing off pure oil may conveniently be included in the structure. A small spigot 13 is used to indicate and regulate by its manipulation the height to which the separating tank 1 is adapted to be filled with the treatment liquid, as for example, the solution of tri-sodium phosphate, and another spigot 14 is used to indicate the height at which the top of the oil should be when a full batch or charge is placed upon the measured quantity of treatment liquid. Other spigots 15, 16 and 17, may be located a short distance apart and slightly above the spigot 13, by means of which the dividing point between pure oil and foreign matter, may be ascertained after the tank ingredients have been allowed to settle. A receptacle 20, separate from the tank 1 may be provided for containing contaminated oil. An outlet pipe 21 connects the bottom of this receptacle with the top of tank 1, so that when air under pressure is admitted above the contaminated oil by means of the pipe 22, the oil is driven through the pipe 21 into the tank 1. The opening in the top of the receptacle, through which the impure oil is adapted to be introduced into the receptacle may conveniently be closed by a weighted closure 23 which may, if necessary, act as a safety valve.

In the operation of the device described, the pipe 8 is screwed into the oil inlet 9ª to prevent the filling of the pipes 8 and 9 with the liquids to be placed into the tank, and the spigots 13 and 14 are opened. The treatment liquid is now placed in the tank as for instance, through the opening 24, until it begins to escape through the spigot 13 which is then closed. This liquid may preferably consist of tri-sodium phosphate solution, prepared by dissolving in water one-fourth of a pound of tri-sodium phosphate per gallon of oil to be acted upon, and then adding more water until the level of spigot 13 is reached. The impure oil is now introduced into the tank until the level of spigot 14 is reached, and this spigot is then closed. If compressed air is available, the impure oil is preferably run into separator tank 1 from the receptacle 20 in the manner described. Otherwise, it may be poured through the opening 24. It has been found preferable to so locate spigots 13 and 14 that the volume of oil to be cleansed is substantially equal to the volume of the treatment liquid. It is preferable to conduct the treatment at a temperature of about 130° F. or higher, since at such temperatures a better separation is had than when a colder temperature of treatment exists.

Where the tri-sodium phosphate is used the strength of solution indicated above, while preferable, may be departed from within the limits of the invention, the particular strength indicated being that which has been found adequate for the separation of greatly contaminated oil. Oil of a lesser degree of contamination may be treated with a solution of lesser strength. The ratio of solution volume to volume of charge of contaminated oil, given in the above example, is substantially 1 to 1. This we find to be a preferable ratio. Whether the tri-sodium phosphate, water or some other liquid be used, however, the ratio of the two volumes should not be less than 3 to 10. In practice we find that at least this amount of solution as compared with the volume of charge is necessary to secure satisfactory purification.

After the above operations have been carried out, the contents of the tank are thoroughly mixed by being agitated by air through pipe 2 or by mechanical stirring or other suitable means, and then left to settle for a suitable time. In practice agitation for about one hour and settling for about 23 hours has been found suitable. During the agitation and settling, it is advantageous to flow hot water or steam through the coil 3, in order to maintain the contents at a desirable temperature.

After the settling operation it will be found that the oil, impurities and treatment solution have separated out in layers, the oil being above substantially the dotted line A, the impurities which may consist principally of carbon and the like resulting for example from carbonization in the engine, being susbtantially between the dotted lines A and B and the treatment solution being below the line B. A negligible amount of impurity, such as certain metallic particles heavier than the solution, settles to the bottom of the tank or is held in suspension in the solution. A proportion of such heavy impurity may be retained in the layer of impurities above mentioned. The recovered oil is in any case clean and pure and ready for drawing off through the devices provided for that purpose. The treatment solution may be slightly discolored and contaminated, but it is generally if not always again capable of use one or more times. When oil to be acted upon is badly contaminated, it is advantageous to give it a preliminary treatment of about 15 minutes agitation and about 1 hour settling, using for this purpose a small amount of the previously used treatment solution.

The pure oil may in part be drawn off through the spigot 12 even before the settling is completed; after settling, the bulk of pure oil is preferably drawn off through the pipe 9, by unscrewing the pipe 8 from the inlet 9ª, and opening the cock 10, after which water may be quietly introduced at the bottom of the tank, as through the valved pipe 5 and the pipe 7, so as to raise the level of the small amount of pure oil still remaining in the tank, and cause it to flow through the pipe 9. By having the outlet 9ª horizontal and approximately at the lower surface of the oil, the latter is removed quickly and without appreciably disturbing the layers of impurities and treatment solution. The tri-sodium phosphate solution is removed through the pipe 7, 7' and either saved for re-use or disposed of as is most convenient. The impurities may be drawn off in the same way and either kept separate from the solution or mixed therewith; the film of oil remaining on the top of the foreign matter may be caught in a separate receptacle and subsequently incorporated with a new batch of used oil which it is desired to separate.

We claim:

1. The process of purifying lubricating oil containing carbon particles due to the incomplete combustion of liquid fuel, which comprises violently agitating a charge of said oil with a body of liquid whose specific gravity is greater than that of the charge and incapable of chemically re-acting with the oil, the amount of said liquid being materially greater than is required to effect the ultimate collection of the carbon particles of the charge and sufficient to form a layer of such liquid below the layer of collected carbon, then allowing the mixture to settle in layers one of which will be substantially clear oil, the mixture being heated to a temperature not less than 90° F. while the preceding operations are performed and finally separating the layer of clear oil from the other layers.

2. The process of purifying lubricating oil containing carbon particles due to the incomplete combustion of liquid fuel, which comprises violently agitating a charge of said oil with a body of liquid whose specific gravity is greater than that of the charge and incapable of chemically reacting with the oil, said liquid being constituted of water and a substance of greater specific gravity than the oil, the amount of water being materially greater than is required to effect the ultimate collection of the carbon particles of the charge and sufficient to form a layer of such liquid below the layer of collected carbon, then allowing the mixture to settle in layers one of which will be substantially clear oil, the mixture being heated to a temperature of more than 90° F. while the preceding operations are performed and finally separating the layer of clear oil from the other layers.

3. The process of purifying lubricating oil containing carbon particles due to the incomplete combustion of liquid fuel which comprises violently agitating a charge of said oil with a body of liquid whose specific gravity is greater than that of the charge and incapable of chemically reacting with the oil, the amount of said liquid being materially greater than is required to effect the ultimate collection of the carbon particles of the charge and sufficient to form a layer of such liquid below the layer of collected carbon, the ratio of volume of liquid to volume of used charge being not less than 1 to 3, then allowing the liquid to settle in layers, one of which will be substantially clear oil, the mixture being heated to an oil expanding temperature, to wit, not less than 90° F. while the preceding operation is being performed and then finally separating the layer of clear oil from the other layers.

4. The process of purifying lubricating oil containing carbon particles due to the incomplete combustion of liquid fuel, which comprises violently agitating a charge of said oil with a body of tri-sodium phosphate solution, the amount of said liquid being materially greater than is required to affect the ultimate collection of the carbon particles of the charge and sufficient to form a layer of such liquid below the layer of collected carbon, then allowing the mixture to settle in layers one of which will be substantially clear oil, the mixture being heated to a temperature of more than 130° F. while the preceding operations are performed and finally separating the layer of clear oil from the other layers.

5. The process of treating used lubricating oil containing fine carbon particles and recovering pure lubricating oil therefrom, which comprises violently agitating said charge with a body of liquid whose specific gravity is greater than that of the charge and incapable of chemically reacting with the oil, the ratio of volume of liquid to volume of used charge being not less than 1 to 3, then allowing the mixture to settle in layers one of which will be substantially clear oil, the mixture being heated to a temperature of more than 130° F. while the preceding operations are performed and finally separating the layer of clear oil from the other layers.

In testimony whereof we have hereunto set our hands in the presence of two subscribing witnesses.

CHARLES J. SKIDMORE.
PETER F. CONERTY.

Witnesses:
JOHN A. FERGUSON,
FRED A. KLEIN.